United States Patent [19]

Eaton et al.

[11] Patent Number: 5,598,601
[45] Date of Patent: Feb. 4, 1997

[54] DISPOSABLE CONTACT LENS CLEANING DEVICE AND METHOD OF MAKING THE SAME

[76] Inventors: David B. Eaton, 314 Wallace Rd., Memphis, Tenn. 38117; Sandra E. Saunders, 11 Morningside Park, Memphis, Tenn. 38104

[21] Appl. No.: 386,749

[22] Filed: Feb. 10, 1995

[51] Int. Cl.$^6$ ...................................................... A47L 25/00
[52] U.S. Cl. .......................... 15/214; 15/244.4; 428/308.4; 300/21
[58] Field of Search ........................... 15/104.93, 214, 15/223, 244.1, 244.3, 244.4; 118/270; 264/321; 427/244; 604/286; D32/40; 300/21; 428/308.4, 304.4

[56] References Cited

U.S. PATENT DOCUMENTS

| | | | |
|---|---|---|---|
| 418,707 | 1/1890 | Ely | 15/214 |
| 892,303 | 6/1908 | Porter | 15/214 |
| 1,756,713 | 4/1930 | Vernet | 15/244.4 |
| 2,121,384 | 6/1938 | Gray | 15/244.4 |
| 2,490,636 | 12/1949 | Klein | 15/214 |
| 3,005,219 | 10/1961 | Miller | 15/118 |
| 3,171,151 | 3/1965 | Sickle et al. | 15/118 |
| 3,377,643 | 4/1968 | Teng et al. | 15/118 |
| 3,694,845 | 10/1972 | Engelsher | 15/244.4 |
| 3,849,225 | 11/1974 | Haertle | 15/244.3 |
| 3,857,133 | 12/1974 | Linenfelser | 15/118 |
| 3,861,993 | 1/1975 | Guthrie | 15/118 |
| 3,954,537 | 5/1976 | Alfter et al. | 156/82 |
| 4,779,300 | 10/1988 | Pompe | 15/104.93 |
| 5,146,646 | 9/1992 | Langford et al. | 15/210.1 |

FOREIGN PATENT DOCUMENTS 777411  6/1957  United Kingdom ................. 15/244.4

*Primary Examiner*—David Scherbel
*Assistant Examiner*—Tony G. Soohoo
*Attorney, Agent, or Firm*—Walker, McKenzie & Walker, P.C.

[57] ABSTRACT

A totally disposable contact lens cleaning device including a polyurethane ester foam, contact lens cleaning pad and a polyethylene cross linked foam, soft base member thermally bonded to the contact lens cleaning pad. The contact lens cleaning device is manufactured by cutting an aperture through a soft base member; and then thermally bonding a contact lens cleaning pad to the soft base member over the aperture.

6 Claims, 1 Drawing Sheet

U.S. Patent  Feb. 4, 1997  5,598,601
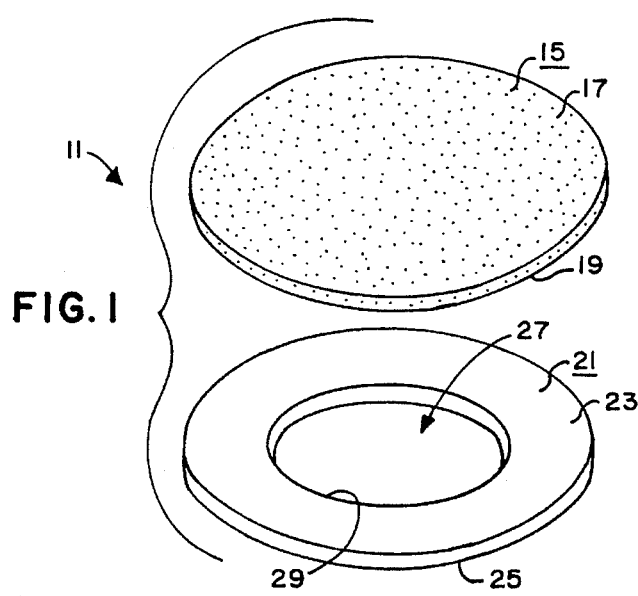
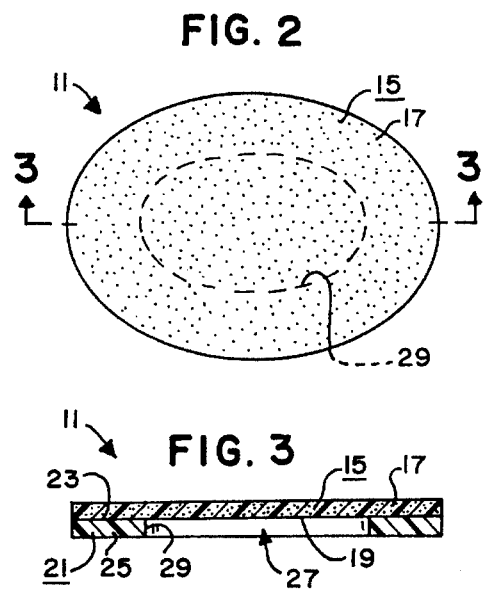
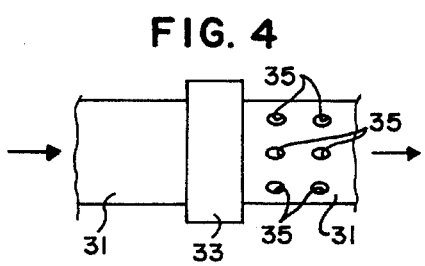
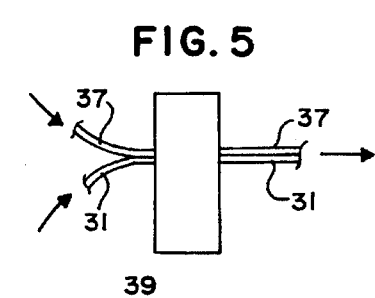
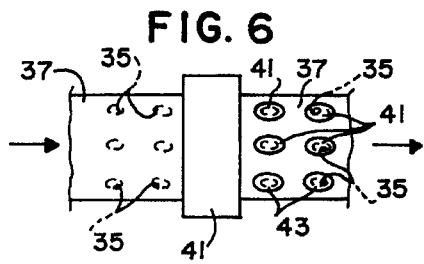
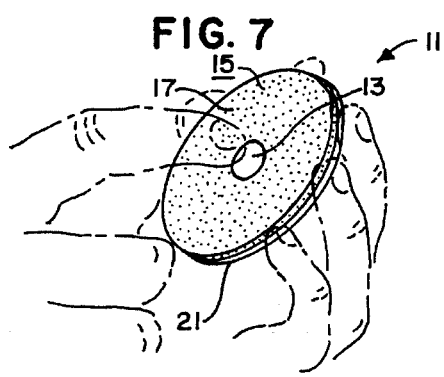
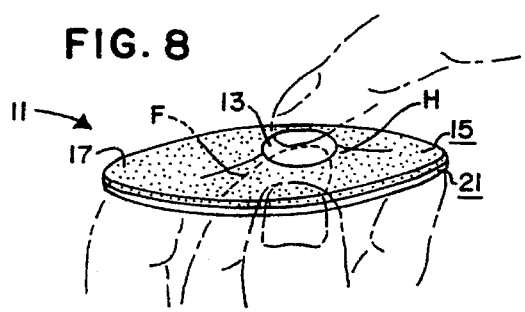

DISPOSABLE CONTACT LENS CLEANING DEVICE AND METHOD OF MAKING THE SAME

BACKGROUND OF THE INVENTION

1. Field of the Invention

The present invention relates, in general, to a device for and a method of manufacturing a totally disposable device for cleaning contact lenses.

2. Description of the Related Art

A leading cause of contact lens discomfort and shortened wearing time is the failure of the wearer to keep the contact lenses free of surface deposits and coatings. These hard to clean coatings on contact lenses are due to tear film mucous, protein, cosmetics, smog, air pollution and many other substances that are present in our daily lives. Failure to clean off these deposits can result in dryness, blurriness and other eye irritations.

Contact lens cleaning solutions for both soft and rigid lenses rely primarily on the user rubbing or scrubbing their lenses against the skin of the palm of the hand or fingers. This is a hazardous and inefficient cleaning method at best and often results in scratched, nicked, or torn lenses. Skin roughness and minute particles embedded in the skin can easily scratch or damage a lens and the skin's natural oiliness can even add to the surface buildup.

One attempt to solve these problems is a kit marketed for professional use only by Polymer Technology Corporation of Wilmington, Mass. 01887 as The Boston Lens Cleaning Polish and Manual Polishing Machine. This kit includes a bottle of liquid cleaning polish, a velveteen pad held taut between two substantially rigid plastic rings that form a frame similar to a typical hoop-type embroidery frame, and a suction cup holder for gripping a contact lens to be cleaned. To use this kit, the velveteen pad is soaked with water and 4 to 6 drops of the cleaning polished is applied. The suction cup holder can then be used to grip one side of the lens to be cleaned and to allow the user to rub the side of the lens opposite the suction cup holder firmly on the velveteen pad with a combined rotating and oscillating motion. The pad must be periodically replaced.

Pompe, U.S. Pat. No. 4,779,300, issued Oct. 25, 1988, discloses an appliance for cleaning hard or soft contact lenses that is somewhat similar to The Boston Lens device. That is, the Pompe contact lens cleaning appliance includes a cleaning pad for being held taut between two members that form a frame. One of the frame members consists of a generally oval base sized to fit in a person's palm. The base has a flat top surface, a flat bottom surface, and a circular hole extending therethrough between the top and bottom surfaces. The other frame member consists of a ring for being inserted into the hole through the base. The cleaning pad is positioned over the top of the ring with the sides of the cleaning pad being frictionally held between the side of the hole through the base and the outer side of the ring. The cleaning pad is a laminate of foam type material and fabric type material. To use the Pompe contact lens cleaning appliance, a small amount of cleaning solution is applied to the top surface of the cleaning pad and a contact lens is placed on the cleaning pad and manipulated thereon by a finger, preferably using a back and forth motion. The cleaning pad must be periodically replaced.

None of the above identified cleaning methods or devices disclose or suggest the present invention. More specifically, none of the above identified cleaning methods or devices disclose or suggest a totally disposable contact lens cleaning device including a contact lens cleaning pad and a soft base member thermally bonded to the contact lens cleaning pad, or a method of making a contact lens cleaning device by cutting an aperture through a soft base member and then thermally bonding a contact lens cleaning pad to the soft base member over the aperture.

SUMMARY OF THE INVENTION

The present invention is directed toward providing an improved contact lens cleaning device and an improved method of making contact lens cleaning devices. A basic concept of the present invention is to thermally bond a contact lens cleaning pad to a soft base member.

The totally disposable contact lens cleaning device of the present invention includes, in general, a contact lens cleaning pad and a soft base member thermally bonded to the contact lens cleaning pad.

The method of making a totally disposable contact lens cleaning device of the present invention includes, in general, the steps of cutting an aperture through a soft base member and then thermally bonding a contact lens cleaning pad to the soft base member over the aperture.

One object of the present invention is to provide a contact lens cleaning device that has no hard corners or edges that might damage a contact lens as the contact lens is moved on the top surface thereof.

Another object of the present invention is to provide such a contact lens cleaning device that includes no glue or other adhesive for securing the contact lens cleaning pad to the soft base member that could damage or contaminate a contact lens.

Another object of the present invention is to provide such a contact lens cleaning device that is simple and inexpensive to manufacture.

Another object of the present invention is to manufacture such a contact lens cleaning device by thermally bonding a contact lens cleaning pad to a soft base member.

BRIEF DESCRIPTION OF THE DRAWINGS

FIG. 1 is an exploded perspective view of the contact lens cleaning device of the present invention.

FIG. 2 is a top plan view of the contact lens cleaning device of the present invention.

FIG. 3 is a sectional view substantially as taken on line 3—3 of FIG. 2.

FIG. 4 is a somewhat diagrammatic top plan view of a die cutting apparatus and an elongated sheet of polyethylene cross linked foam, illustrating a first step in the manufacture of the preferred embodiment of the contact lens cleaning device of the present invention.

FIG. 5 is a somewhat diagrammatic side elevational view of a thermal heating apparatus, an elongated sheet of polyethylene cross linked foam, and an elongated sheet of polyurethane ester foam, illustrating a second step in the manufacture of the preferred embodiment of the contact lens cleaning device of the present invention.

FIG. 6 is a somewhat diagrammatic top plan view of a die cutting apparatus, an elongated sheet of polyethylene cross linked foam, and an elongated sheet of polyurethane ester foam, illustrating a third step in the manufacture of the preferred embodiment of the contact lens cleaning device of the present invention.

FIG. 7 is a pictorial view of the contact lens cleaning device of the present invention in combination with a contact lens and a user's hands, illustrating a first method of using the contact lens cleaning device of the present invention.

FIG. 8 is a pictorial view of the contact lens cleaning device of the present invention in combination with a contact lens and a user's hands, illustrating a second method of using the contact lens cleaning device of the present invention.

DESCRIPTION OF THE PREFERRED EMBODIMENT

The preferred embodiment of the disposable contact lens cleaning device of the present invention is shown in FIGS. 1–3, 7 and 8 and identified by the numeral 11. The contact lens cleaning device 11 is designed for use in cleaning soft, hard and gas permeable contact lens such as the contact lens 13 shown in FIGS. 7 and 8 to keep such contact lenses free of surface deposits and coatings that form due to tear film mucous, protein, cosmetics, smog, air pollution and the like.

The contact lens cleaning device 11 includes a contact lens cleaning pad 15. The contact lens cleaning pad 15 is preferably constructed of polyurethane ester foam. The contact lens cleaning pad 15 preferably includes a top surface 17 and a bottom surface 19. The top and bottom surfaces 17, 19 of the contact lens cleaning pad 15 are preferably substantially oval in shape for allowing the user of the contact lens cleaning device 11 to easily hold the contact lens cleaning pad 15 in one hand (see FIGS. 7 and 8). The contact lens cleaning pad 15 may be manufactured in various sizes and designs out of various materials in various manners as will now be apparent to those skilled in the art. Thus, for example, the contact lens cleaning pad 15 is preferably cut from a relatively thin sheet of polyurethane ester foam in a substantially oval shape having a thickness of approximately 0.125 inches (3.175 millimeters), a major axis of approximately 2.75 inches (69.85 millimeters), and a minor axis of approximately 2 inches (50.8 millimeters).

The contact lens cleaning device 11 includes a soft base member 21 thermally bonded to the contact lens cleaning pad 15. The soft base member 21 is preferably constructed of polyethylene cross linked foam. The soft base member 21 preferably includes a top surface 23 and a bottom surface 25 with the top surface 23 being thermally bonded to the bottom surface 19 of the contact lens cleaning pad 15. The top and bottom surfaces 23, 25 of the soft base member 21 are preferably substantially identical in shape (e.g., substantially oval shaped) and size to the contact lens cleaning pad 15 for allowing the user of the contact lens cleaning device 11 to easily hold the soft base member 21 in one hand (see FIGS. 7 and 8). The soft base member 21 may be manufactured in various sizes and designs out of various materials in various manners as will now be apparent to those skilled in the art. Thus, for example, the soft base member 21 is preferably cut from a relatively thin sheet of polyethylene cross linked foam in a substantially oval shape having a thickness of approximately 0.125 inches (3.175 millimeters), a major axis of approximately 2.75 inches (69.85 millimeters), and a minor axis of approximately 2 inches (50.8 millimeters). The top surface 23 of the soft base member 21 preferably has a central portion 27 which allows the portion of the contact lens cleaning pad 15 over the central portion 27 to be easily molded to the contour of a contact lens 13. More specifically, the soft base member 21 preferably has a cavity or hole 29 extending completely through the soft base member 21 for defining the central portion 27 and for allowing the user of the contact lens cleaning device 11 to insert a finger F into the cavity 27 and push up against the bottom surface 19 of the portion of the soft contact lens cleaning pad 15 over the cavity 29 to form a hump H in the contact lens cleaning pad 15 to receive the concave side of the contact lens 13 (see FIG. 8). The cavity 29 is preferably substantially oval shaped and may have a major axis of 1.75 inches (44.45 millimeters) and a minor axis of 1 inch (25.4 millimeters).

The operation and use of the contact lens cleaning device 11 of the present invention is shown somewhat diagrammatically in FIGS. 7 and 8. In general, for cleaning a contact lens 13, the contact lens cleaning device 11 should be held with the top surface 17 of the contact lens cleaning pad 15 facing up. Next, about 6 to 8 drops of a contact lens cleaning solution is applied to the top surface 17 of the contact lens cleaning pad 15. The first side of the contact lens 13 is then placed on the top surface 17 of the contact lens cleaning pad 15 and gently rubbed back and forth over the top surface 17 of the contact lens cleaning pad 15 using a finger F or the like. The first side of the contact lens 13 should then be rinsed with a saline solution or the like. The contact lens 13 is then turned over and the second side of the contact lens 13 is placed on the top surface 17 of the contact lens cleaning pad 15 and gently rubbed back and forth over the top surface 17 of the contact lens cleaning pad 15 using a finger F or the like. The second side of the contact lens 13 should then be rinsed with a saline solution or the like.

To clean the concave side (inside curvature) of hard or rigid contact lens, the user should place an index finger F through the cavity 29, against the bottom surface 19 of the contact lens cleaning pad 15, and push upwardly to form a hump H on the top surface 17 of the contact lens cleaning pad 15 as shown in FIG. 8. The concave side of the contact lens 13 can then be rubbed back and forth on the hump H. The concave side of the contact lens 13 should then be rinsed with a saline solution or the like.

It is important for the user to avoid contacting the contact lens 13 with any hard or sharp objects such as fingernails or the like. However, since the contact lens cleaning device 11 itself does not include any hard or sharp corners or components, the user does not have to maintain the contact lens 13 over the cavity 29 while rubbing it back and forth on the top surface 17 of the contact lens cleaning pad 15.

The contact lens cleaning device 11 should be completely rinsed under warm tap water after each use and, for most effective cleaning, should be totally disposed of, discarded and replaced with a new contact lens cleaning device 11 every 7 days.

The method of making the totally disposable contact lens cleaning device 11 of the present invention is shown somewhat diagrammatically in FIGS. 4–6. The preferred method of making the soft base member 21 is to pass a sheet 31 of polyethylene cross linked foam through a first substantially typical die 33 or the like for cutting a plurality of spaced apart, substantially oval-shaped apertures 35 through the sheet 31 as shown in FIG. 4 in any manner now be apparent to those skilled in the art. Each aperture 35 in the sheet 31 will form or define a cavity 29 of the finished soft base member 21. Next, it is preferred that a sheet 37 of polyurethane ester foam be thermally bonded to the sheet 31 after the apertures 35 are cut into the sheet 31. Thus, after the sheet 31 exits the die 33, it is aligned with the sheet 37 and fed through a substantially typical thermal heating unit 39 as shown in FIG. 5. Next, the thermally bonded sheets 31, 37 are preferably fed through a second substantially typical die 41 or the like for cutting a plurality of spaced apart, substantially oval-shaped plugs 43 out of the sheet 31 of polyethylene cross linked foam and out of the sheet 37 of polyurethane ester foam with each plug 43 substantially centered about one of the apertures 35 through the sheet 31 as shown in FIG. 6. Each plug 43 forms a separate contact lens cleaning device 11 of the present invention.

Although the present invention has been described and illustrated with respect to a preferred embodiment, a preferred method of manufacture thereof, and a preferred use therefor, it is not to be so limited since modifications and changes can be made therein which are within the full intended scope of the invention.

We claim:

1. A totally disposable contact lens cleaning device comprising:

(a) a contact lens cleaning pad constructed of polyurethane ester foam; and (b) a soft base member constructed of polyethylene cross linked foam and thermally bonded to said contact lens cleaning pad said soft base member having a cavity for allowing the user of said contact lens cleaning pad to apply pressure against a portion of the lens cleaning pad over said cavity.

2. A totally disposable contact lens cleaning device comprising:

(a) a contact lens cleaning pad; and (b) a soft base member having a top surface thermally bonded to said contact lens cleaning pad; said top surface of said soft base member having a central portion which allows the portion of said contact lens cleaning pad over said central portion to be easily molded to the contour of a contact lens; said central portion of said top surface of said soft base member having a cavity extending completely through said soft base member for allowing the user of said contact lens cleaning device to insert a finger into said cavity and against the portion of said soft contact lens cleaning pad over said cavity through said soft base member.

3. A method of making a totally disposable contact lens cleaning device, said method comprising the steps of:

(a) cutting an aperture through a soft base member; and then (b) thermally bonding a contact lens cleaning pad to the soft base member over the aperture.

4. The method of claim 3 in which said soft base member is constructed from a sheet of polyethylene cross linked foam; and in which is included the step of cutting an aperture through said sheet of polyethylene cross linked foam before thermally bonding said contact lens cleaning pad thereto.

5. The method of claim 3 in which said contact lens cleaning pad is constructed from a sheet of polyurethane ester foam; and in which is included the step thermally bonding said sheet of polyurethane ester foam to said sheet of polyethylene cross linked foam over said aperture cut through said sheet of polyethylene cross linked foam after said aperture is cut through said sheet of polyethylene cross linked foam.

6. The method of claim 5 in which is included the step of then cutting an oval shaped plug out of said thermally bonded sheets of polyurethane ester foam and polyethylene cross linked foam centered about said aperture cut through said sheet of polyethylene cross linked foam so that said oval shaped plug of said sheet of polyurethane ester foam forms said contact lens cleaning pad and said oval shaped plug of said sheet of polyethylene cross linked foam forms said soft base member.

\* \* \* \* \*